United States Patent [19]
Conboy et al.

[11] Patent Number: 6,035,245
[45] Date of Patent: Mar. 7, 2000

[54] AUTOMATED MATERIAL HANDLING SYSTEM METHOD AND ARRANGEMENT

[75] Inventors: Michael R. Conboy, Austin; Patrick J. Ryan, Kyle; Elfido Coss, Jr., Austin, all of Tex.

[73] Assignee: Advanced Micro Devices, Inc., Sunnyvale, Calif.

[21] Appl. No.: 09/046,854

[22] Filed: Mar. 24, 1998

[51] Int. Cl.$^7$ .................................................. G06F 17/00
[52] U.S. Cl. ...................... 700/214; 700/112; 700/113; 700/228; 700/218
[58] Field of Search .................................. 700/228, 229, 700/214, 213, 97, 108, 112, 113, 121, 253, 218

[56] References Cited

U.S. PATENT DOCUMENTS

| | | | |
|---|---|---|---|
| 5,818,716 | 10/1998 | Chin et al. | 364/468.06 |
| 5,867,388 | 2/1999 | Okumura et al. | 364/468.19 |
| 5,926,774 | 7/1999 | Ohishi | 702/113 |

OTHER PUBLICATIONS

Law, A. M. et al., "Simulation Modeling and Analysis Second Edition", 8 pages (1991).

*Primary Examiner*—Christopher P. Ellis
*Assistant Examiner*—Khoi H. Tran

[57] ABSTRACT

A computer controlled manufacturing arrangement and method for selecting between multiple paths for transporting cassettes between processing locations. The manufacturing arrangement includes a plurality of stockers interconnected with tracks on which cassettes are carried on vehicles. A first and second stocker are interconnected by at least a first path and a second path formed by the tracks, and a cassette can be transported from the first to the second stocker via either of the two paths. A plurality of robotic arrangements are configured to transfer cassettes between the stockers and the vehicles. A data processing system is coupled to the robotic arrangements and configured and arranged to maintain an historical record of codes indicative of periods of time expended in transporting cassettes from the first stocker to the second stocker via the first path and second path, respectively. When a cassette is to be transported from the first stocker to the second stocker, the data processing system determines, as a function of the historical record of codes associated with the paths, which of the first or second paths is more likely to result in a lesser period of time in transporting the cassette, and selects one of the first or second paths according to which path is more likely to result in a lesser period of time in transporting the cassette. The robotic arrangement is then instructed to load the cassette on the vehicle of the selected path.

17 Claims, 7 Drawing Sheets

Fig. 4

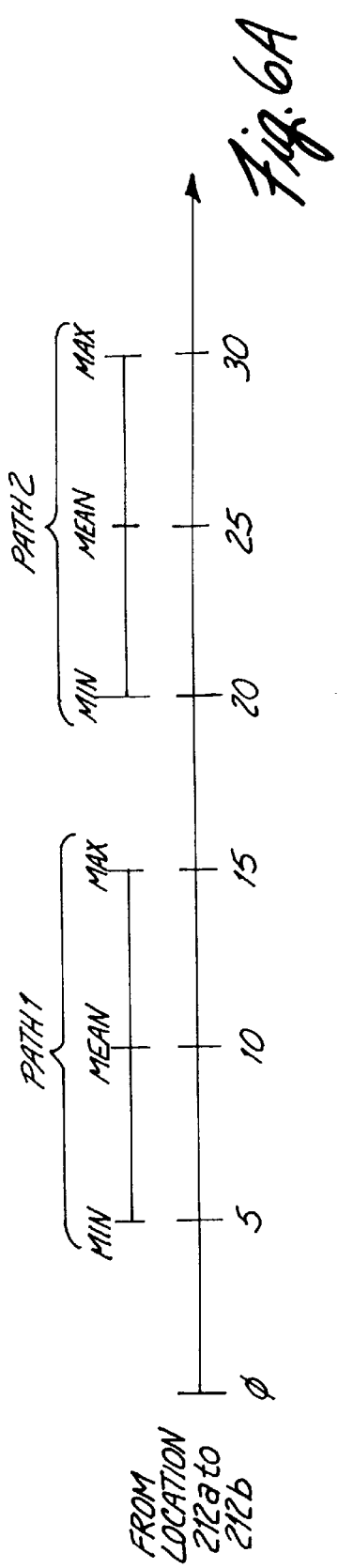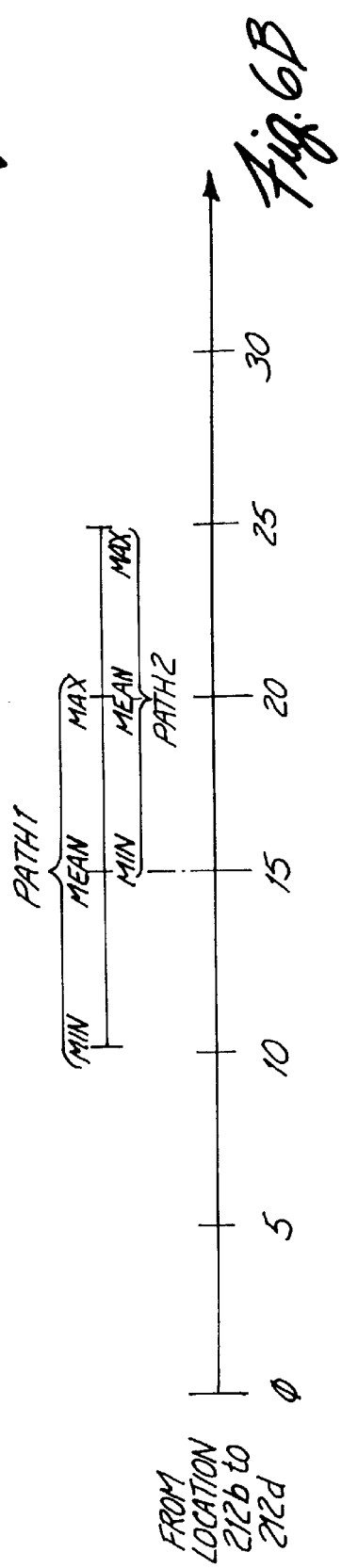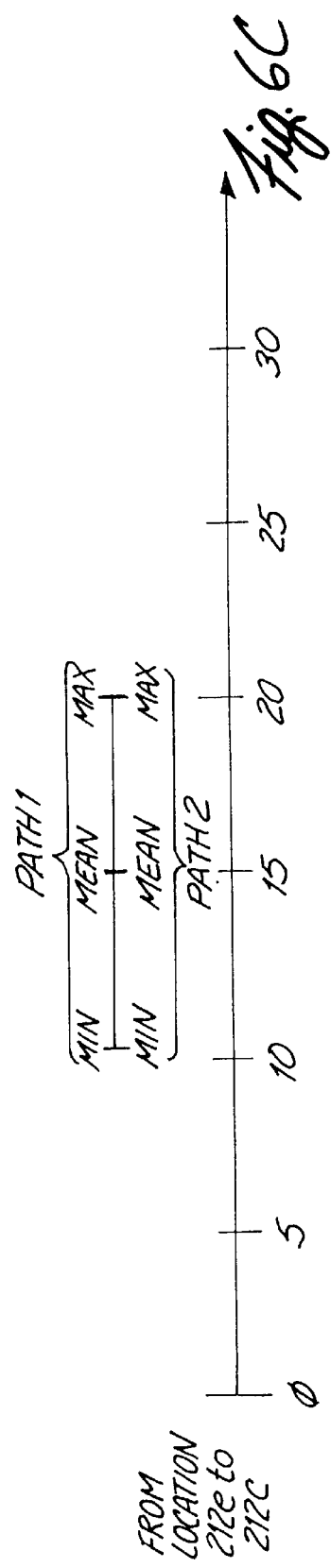

AUTOMATED MATERIAL HANDLING SYSTEM METHOD AND ARRANGEMENT

BACKGROUND OF THE INVENTION

This invention relates generally to the fabrication of integrated circuits on semiconductor wafers, and more particularly to the logistics of moving wafers for processing during fabrication.

A fabrication plant is usually divided into separate areas for particular portions of the fabrication process. Each processing area is called a bay, and each bay contains equipment that is required to process wafers for a certain purpose. In addition to the equipment, material stockers are present near the bay. A material stocker is a large automated cabinet where wafers are stored while waiting to be processed. The wafers are stored in cassettes, and each cassette can hold up to twenty-five wafers. A lot is a logical grouping of wafers in a cassette. The lot can migrate from cassette to cassette as it progresses through the chain of production processes.

A material stocker can hold hundreds of cassettes and services two bays. When a cassette of wafers is ready to be stored in a material stocker, the operator places the cassette at one of the input ports of the material stocker.

When an operator wishes to retrieve a lot from a material stocker, he issues a request via the application program of the host computer. The operator may need empty cassettes to configure or process the wafers. Empty cassettes may be stored in a material stocker, so the operator must have the capability to request empty cassettes. In addition to manipulation of the wafers, the operator may also need to manipulate, or set up, the equipment for an operation.

Once a lot has been retrieved, and the equipment has been set up, the operation on the wafers by a particular piece of equipment, or "tool," can begin. At this point, the lot is "moved-in" to the operation. This state is indicated to the host application by the operator for the lot. The lot remains in this state until the operation is completed. Once the operation is completed, the operator must perform tests and verifications on the wafers. When all tests and verifications have been performed, the host computer application program must be notified. Wafers may have moved from one cassette to another as a result of the operation. The host application has to be notified of this. The operator then places the cassette of "moved-out" wafers in the material stocker, to await orders as to the location of the next piece of equipment which will perform operations on the wafers.

Present automated material handling systems (AMHSs) do not always select the most efficient path for transporting cassettes from one location to another. To illustrate, in many manufacturing environments there are multiple paths by which a cassette may be moved between locations. The paths include physical tracks on which vehicles carry the cassettes, and stockers are present at various locations along the tracks. The length of time required to move a cassette from one location to another is dependent upon the path selected. The reasons for the different transportation times include variations in physical lengths of paths as well as stockers interposed on the tracks between locations. For manufacturing floor efficiency, it is desirable for cassettes to be transported between locations without unnecessary delays.

Present systems are programmed to move a cassette from one location to another such that either a predetermined path is selected or where there are multiple paths, the selection method alternates between the available paths for successive cassettes. If the same path is always selected to moves cassettes, movement delays may occur as a result of too many cassettes being transported on the path. If the system alternates between available paths, some cassettes may be transported very efficiently, while others have relatively long transport times as a result of, for example, physical path length. It would be desirable, therefore, for selection of a path on which to transport a cassette to result in consistently efficient transport times.

SUMMARY OF THE INVENTION

The present invention is directed to a system and method for directing the movement of material in a manufacturing environment having a plurality of paths, including at least a first path and a second path, by which the material may be moved. In a first aspect of the invention, a method is provided for routing cassettes in a computer controlled manufacturing arrangement. The method includes the steps of: maintaining an historical record of codes indicative of periods of time expended in transporting cassettes from a first location to a second location via the first path and second path, respectively; determining, as a function of the historical record of codes associated with the paths, which of the first or second paths is more likely to result in a lesser period of time in transporting the cassette; and selecting one of the first or second paths according to which path is more likely to result in a lesser period of time in transporting the cassette.

In another embodiment, the invention is a method that comprises the steps of: measuring periods of time expended in transporting cassettes from a first location to a second location along the first path; measuring periods of time expended in transporting cassettes from the first location to the second location along the second path; associating time period codes indicative of respective measured periods of time with the first and second paths, respectively; in selecting one of the first or second paths for transporting a particular cassette from the first location to the second location, determining, as a function of the time period codes associated with the respective paths, which of the first or second paths is more likely to result in a lesser period of time in transporting the cassette; and selecting one of the first or second paths according to which path is more likely to result in a lesser period of time in transporting the cassette.

An apparatus for selecting either a first or a second path for transporting a cassette from a first location to a second location in an automated manufacturing arrangement is provided in another embodiment of the invention. The apparatus comprises: means for maintaining an historical record of codes indicative of periods of time expended in transporting cassettes from a first location to a second location via the first path and second path, respectively; means for determining, as a function of the historical record of codes associated with the paths, which of the first or second paths is more likely to result in a lesser period of time in transporting the cassette; and means for selecting one of the first or second paths according to which path is more likely to result in a lesser period of time in transporting the cassette.

In another embodiment, the apparatus comprises: means for measuring periods of time expended in transporting cassettes from a first location to a second location along the first path; means for measuring periods of time expended in transporting cassettes from the first location to the second location along the second path; means for associating time period codes indicative of respective measured periods of time with the first and second paths, respectively; means for determining, as a function of the time period codes associated with the respective paths, which of the first or second paths is more likely to result in a lesser period of time in transporting a particular cassette from the first location to the second location; and means for selecting one of the first or second paths according to which path is more likely to result in a lesser period of time in transporting the particular cassette.

A computer controlled manufacturing arrangement with control for selecting between multiple paths for transporting cassettes between processing locations is provided in another aspect of the invention. The manufacturing arrangement comprises: a plurality of stockers interconnected with tracks on which cassettes are carried on vehicles, wherein a first stocker and a second stocker are interconnected by a first path and a second path formed by the tracks; a plurality of robotic arrangements configured to transfer cassettes between the stockers and the vehicles, wherein a first one of the plurality of robotic arrangements is configured to transfer cassettes between the first stocker and vehicles on the first and second paths; and a data processing system coupled to the robotic arrangements and configured and arranged to maintain an historical record of codes indicative of periods of time expended in transporting cassettes from the first stocker to the second stocker via the first path and second path, respectively, to determine, as a function of the historical record of codes associated with the paths, which of the first or second paths is more likely to result in a lesser period of time in transporting the cassette, and to select one of the first or second paths according to which path is more likely to result in a lesser period of time in transporting the cassette.

The above Summary of the Invention is not intended to describe each disclosed embodiment of the present invention.

BRIEF DESCRIPTION OF THE DRAWINGS

Other aspects and advantages of the present invention will become apparent upon reading the following detailed description and upon reference to the drawings in which:

FIG. 4 is a logical table of minimum, mean, and maximum durations of time expended in transporting cassettes between locations;

FIG. 5 is a logical table having example minimum, mean, and maximum durations of time expended in transporting cassettes between locations;

FIGS. 6A, 6B, and 6C are example time lines that illustrate the relationships between alternate paths available to transport cassettes between selected locations;

Figure 1:
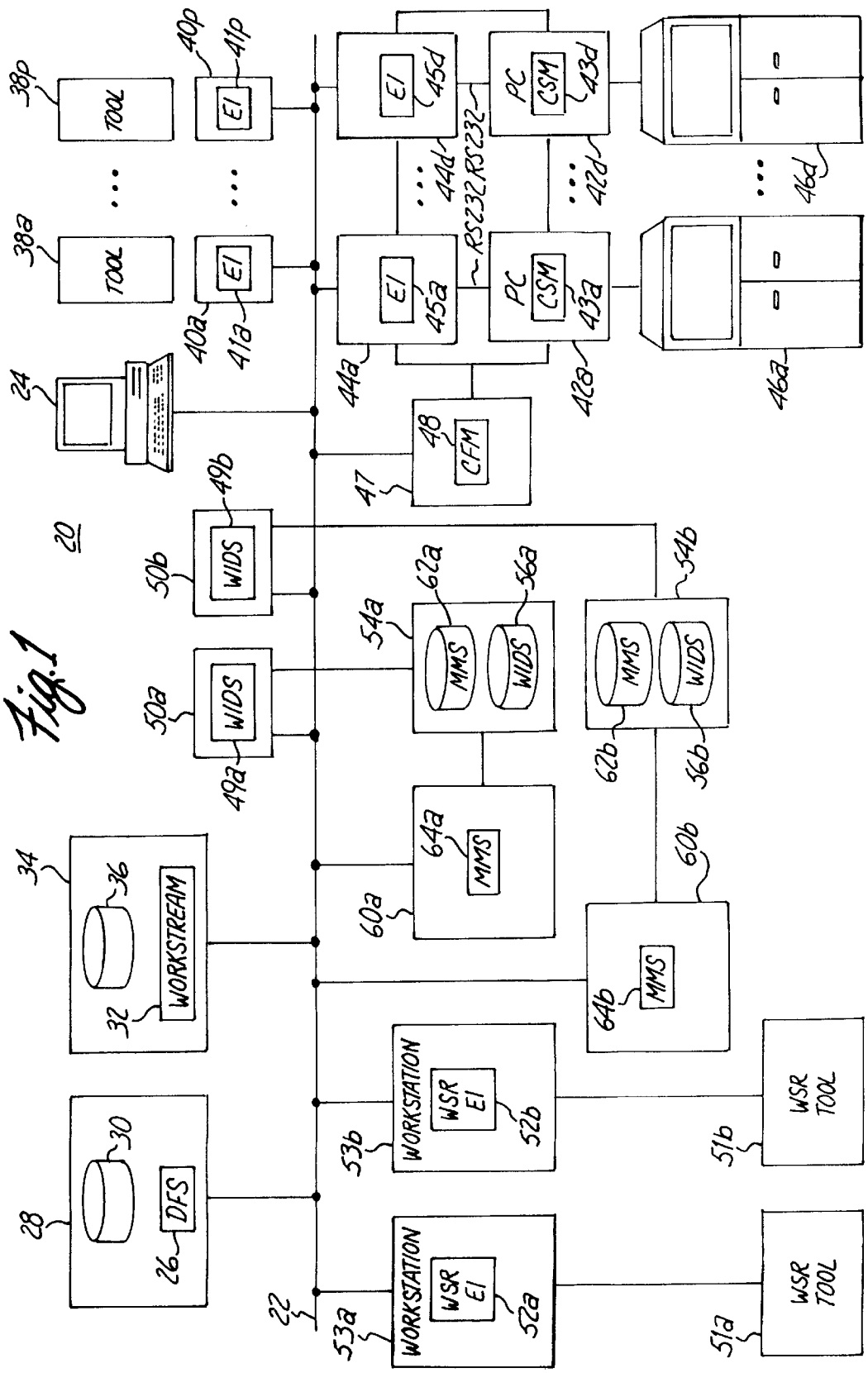
FIG. 1 is a schematic diagram depicting the architecture of a control system for the fabrication of integrated circuits.

While the invention is amenable to various modifications and alternative forms, specifics thereof are shown by way of example in the drawings and in the written description. It should be understood, however, that the intention is not to limit the invention to the particular embodiments described. On the contrary the intention is to cover all modifications, equivalents, and alternatives falling within the spirit and scope of the invention as defined by the appended claims.

DETAILED DESCRIPTION

Referring first to FIG. 1, the reference numeral 20 refers, in general, to a control system for the fabrication of integrated circuits on semiconductor wafers. The control system 20 has a central bus 22 to which the various control elements are coupled. The language, or protocol used on the bus 22 is called ISIS and is sold by ISIS Distributed Systems. A personal computer 24 is coupled to the bus 22 for ad hoc access to all movement functions for the cassettes and wafers.

A distributed factory system (DFS) computer program 26 sold by Consilium, Inc. is resident on a UNIX workstation 28. The UNIX workstation 28 connects to the bus 22 for controlling, by use of the DFS 26, the manufacturing process of the wafers. The DFS 26 does this by tracking the handling of wafers by logical lots. A database 30 for use by the DFS 26, for supplying the needed information to the DFS 26, is also resident on the workstation 28. The database 30 is also supplied by Consilium, Inc. with the DFS 26.

The DFS 26 is the newest version of Consilium's older computer program 32, called "WorkStream Open" or "WorkStream" for short. The program 32 is resident on a UNIX workstation 34, which is also used to control the manufacturing process of the wafers. A database 36 for use by the WorkStream program 32, for supplying the needed information to the WorkStream program 32, is also resident on the workstation 34. The database 36 is supplied by Consilium, Inc. with the WorkStream program 32.

Tools 38a through 38p used in the manufacturing process of the semiconductor wafers are coupled to the bus 22 via Hewlett Packard work stations 40a through 40p, running equipment interface ("EI") programs 41a through 41p, respectively. The equipment interface programs 41a through 41p function as translators between the language of the tools and the ISIS language of the bus 22.

CSM computers 42a through 42d are coupled to the bus 22 via Hewlett Packard work stations 44a through 44d, running equipment interface ("EI") programs 45a through 45d, respectively. The CSMs 43a–d of computers 42a–d are coupled to the EIs 45a–d of computers 44a via a SECS II protocol and RS232 connections between computers 42a–d and 44a–d, respectively.

In an example embodiment, each stocker 46a–d is controlled by a separate CSM computer 42a–d. In another embodiment, one CSM computer controls up to three stockers. The computer s 42a–42d run Sunsoft's "Interactive UNIX" as an operating system, and CSM application programs 43a through 43d, licensed by Daifuku. The computers 42a–42d are inter-coupled to each other via an Ethernet.

The CFM program 48 on computer 47 is coupled to and controls all the CSM computers 42a–42d. Computer 47 is also coupled to the bus 22. The CFM program 48 functions as a global database manager for the CSMs 43a–d and passes misdirected messages to the correct object.

The computers 42a–42d schedule movement of the cassettes in and out of material stockers, schedule movement of the cassettes on an overhead cassette monorail, and keep track of all the cassettes in each stocker, and the lot numbers assigned to each stocker. Because of these functions which they perform, the personal computers 42a–42d ar e referred to as clean stocker managers (CSM). Four material stockers 46a through 46d connect to the personal computers 42a–42d for storing empty cassettes and cassettes of wafers.

Note that CSMs 43a–d are shown in a distributed environment. In an alternate embodiment, a single centralized CSM can be configured and arranged to control all the stockers. Selection of a distributed versus a centralized CSM depends upon particular manufacturing requirements.

When a lot is entered into a stocker, stocker 46a, for example, the cassette identifier containing the lot is read and the information is forwarded from the CSM 43a to the appropriate one of DFS computers 28 or 34 via EI 45a. The DFS then looks up the next operation and destination for the lot. The next operation and destination are forwarded to the CSM 43a. When an example CSM 43a receives the next operation and destination, the CSM 43a performs its own selection of a destination (stocker) where there are multiple destinations at which the designated operation may be performed.

Two wafer ID servers (WIDS) 49a, 49b, which are computer programs resident on UNIX workstations 50a, 50b, respectively, maintain information regarding the wafers in WIDS databases 56a, 56b respectively. Databases 56a, 56b are resident on UNIX workstations 54a, 54b, respectively. The WIDS 49a, 49b maintain in the databases 56a, 56b wafer IDs, positions of the wafers within the cassettes, and the process steps through which each wafer passes. The WIDS database 56a is a backup database to the WIDS database 56b, for providing redundancy.

Wafer sorters (WSR) 51a, 51b are tools that move wafers within and/or between cassettes. They also verify the identity of wafers and cassettes, sort wafers, and split and merge lots. The WSR 51a, 51b are coupled to the bus 22 via WSR equipment interface programs 52a, 52b, respectively, resident on Hewlett Packard workstations 53a, 53b, respectively. The WSR equipment interface programs 52a, 52b act as translators between the language of the WSR 51a, 51b and the ISIS language of the bus 22.

Two workstations 60a, 60b are coupled to the bus 22 and to the workstations 54a, 54b, for access to MMS databases 62a, 62b. The two MMS databases 62a, 62b contain the original cassette IDs, the colors of the cassettes (zone restrictions), cassette tags, lots-to-tags mapping, and configuration information regarding the stockers 46. The two MMS databases 62a, 62b are also used to validate the cassette IDs. In an alternate embodiment, the two MMS databases 62a, 62b are extensions of the Workstream database 36.

The two MMS programs 64a, 64b mesh the two WIDS 49a, 49b and the two MMS databases 62a, 62b with the DFS program 26 and with the WorkStream program 32, using the ISIS bus protocol. The MMS programs 64a, 64b allow a requester to retrieve a cassette tag or ID for a given lot ID, or retrieve a lot ID for a given cassette ID.

The MMS programs 64a, 64b provide facilities for accessing lot and carrier data for shop floor control, provide protocols to external entities to facilitate movement of the wafers on the shop floor, provide user interfaces for ad-hoc use by operators, and are sensitive to time-out values when interacting with the equipment interfaces 45a through 45d.

Figure 2:
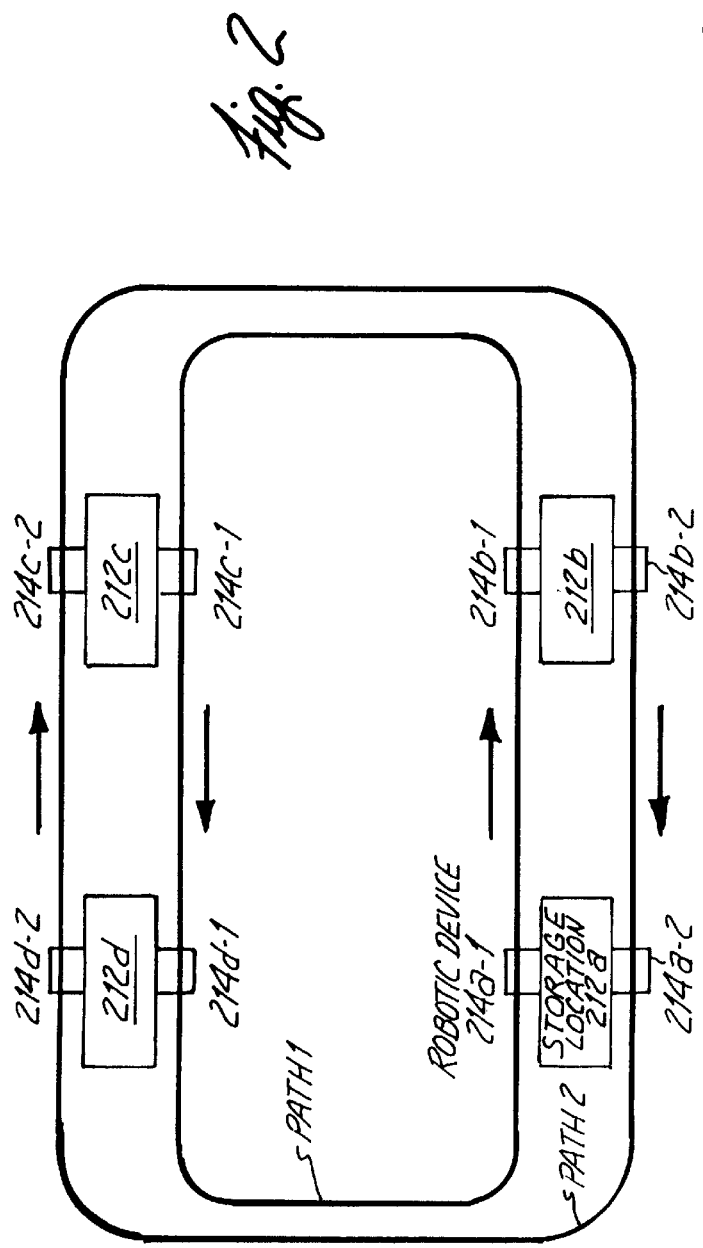
FIG. 2 is a schematic diagram of an example physical layout of an automated manufacturing arrangement.

FIG. 2 is a schematic diagram of an example physical layout of an automated manufacturing arrangement. By way of illustration, the example manufacturing arrangement includes two paths, path 1, and path 2, for transporting cassettes between storage locations 212a, 212b, 212c, and 212d. The invention is, however, not limited to the use of two paths, but extends to cover any number of paths by which cassettes may be moved. The storage locations 212a–d are, for example, conventional stockers.

As indicated by the directional arrows, cassettes on path 1 are transported in a counterclockwise direction, and cassettes transported on path 2 are transported in a clockwise direction. A plurality of robotic devices 214a-1, 214b-1, 214c-1, and 214d-1 are arranged to transfer cassettes between respective ones of the storage locations 212a–d and path 1. It will be appreciated that one or more vehicles (not shown) are available on path 1 for carrying the cassettes. Similarly, robotic devices 214a-2, 214b-2, 214c-2, and 214d-2 are arranged to transfer cassettes between vehicles on path 2 and respective ones of storage locations 212a–d. Example robotic devices 214a-1 through 214d-1 and 214a-2 through 214d-2 are available from Daifuku of Japan. The Daifuku TFE robotic devices are integral 3-axis devices for loading cassettes onto Daifuku clean way vehicles.

To move a cassette from storage location 212a to storage location 212b, for example, a respective one of CSM, 43a–d selects one of robotic devices 214a-1 or 214a-2 to remove the cassette from storage location 212a and place on a clean way vehicle of path 1 or path 2. In the example manufacturing floor arrangement, it can be seen that the physical distance to transport a cassette from storage location 212a to storage location 212b is shorter on path 1 than on path 2. The shorter distance is a result of location 212b being adjacent to location 212a on path 1 in a clockwise direction as compared to location 212b not being adjacent to location 212a on path 2 in a counterclockwise direction. While as between storage locations 212a and 212b path 1 provides a shorter physical distance than does path 2, if path 1 is always selected for transporting a cassette from storage location 212a to storage location 212b, delays may occur because too many vehicles on path 1 are carrying cassettes between these two locations or there are not enough vehicles to service the requests. If the respective CSM, 43a–d simply alternate between selection of path 1 or path 2, the carrying capacity of path 1 may be under-utilized, and too many cassettes may be moved using path 2, thereby incurring processing delays.

In accordance with an example embodiment of the invention, CSMs 43a–d capture and report the durations of time expended in transporting cassettes between the locations 212a–d respectively for path 1 and path 2. When a CSM 43a–d is presented with a request to transport a cassette from location to another, the CSM considers the historical durations of time expended in transporting cassettes between the locations for the respective paths and selects the path most likely to provide a shorter transport time.

Figure 3:
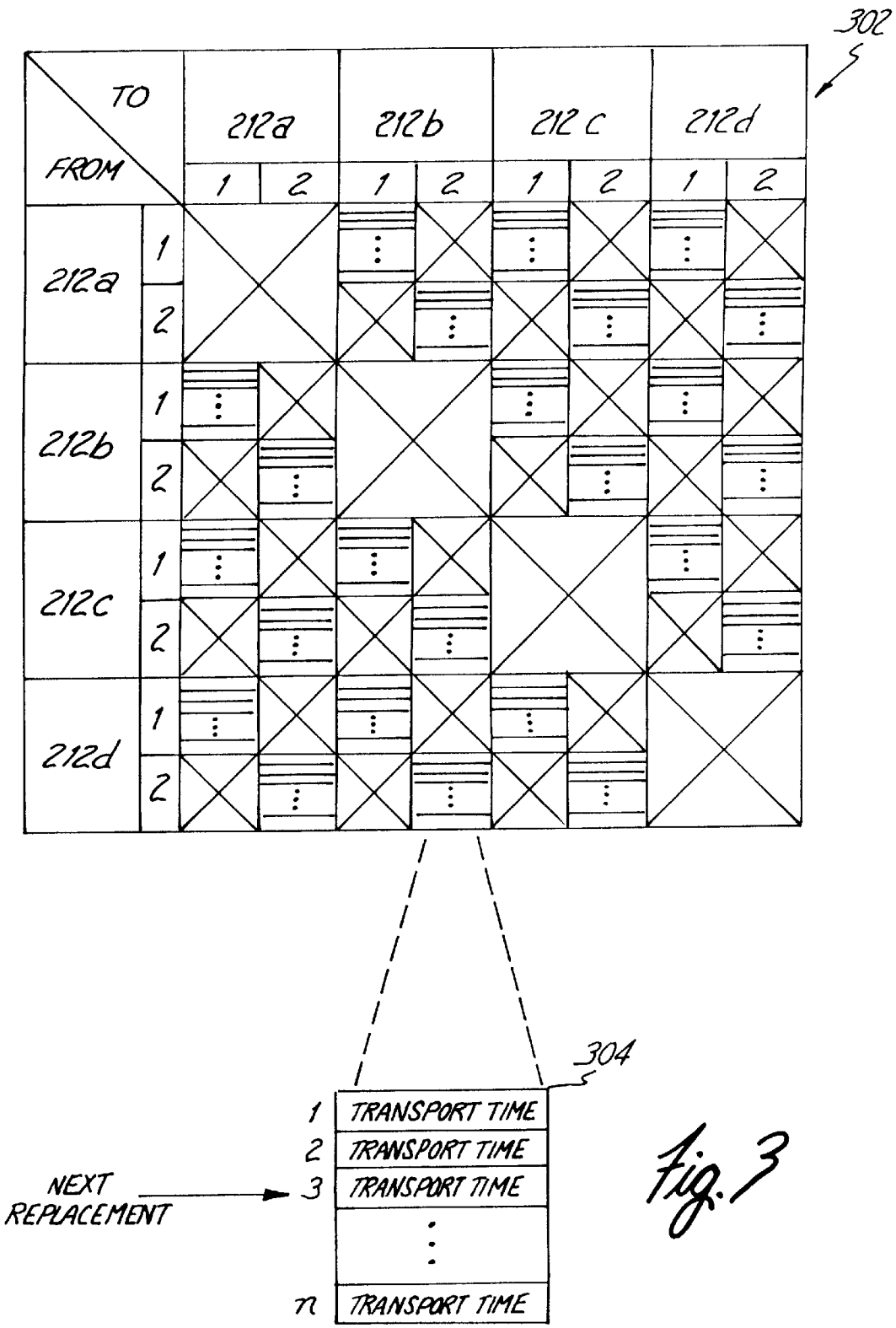
FIG. 3 is a logical table of durations of time expended in transporting cassettes between locations.

FIG. 3 is an example logical table of an historical record of durations of time expended in transporting cassettes between locations on respective paths of the example manufacturing floor arrangement of FIG. 2. For convenience, the table of FIG. 3 will be referred to hereinafter as the transport time table 302. The rows and columns of the transport time table 302 are indexed by the available storage locations in combination with the available paths for transporting cassettes between the storage locations. The locations from which cassettes are transported are indexed by the rows, and the locations to which cassettes are transported are indexed by the columns. In the example table, there are rows and columns for each of storage locations 212a–d. In addition to the indices provided by storage locations 212a–d, path 1 and path 2 also provide indices into the table 302. For example, row 212a is further indexed by path 1 and path 2 and column 212b is further indexed by path 1 and path 2.

Each block, for example block 304, of table 302 contains a plurality of durations of time expended in transporting cassettes between the indexing locations. For example, block 304 includes durations of time expended in transporting cassettes from storage location 212d to storage location 212b via path 2. The respective CSMs 43a–d that control transporting cassettes from location 212d to location 212b capture the times at which cassettes are removed from location 212d and placed on vehicles of path 2, capture the times at which cassettes are removed from vehicles of path 2 and loaded into storage location 212b, and report the differences between these times a s the duration times. In the example embodiment, the transport lines are reported to the CFM 48. As shown in the example block 304, each block includes up to n transport times. In the example, the block of transport times is maintained in a circular fashion where a next replacement pointer references the next entry in the block 304 to be replaced. In this manner, only the n most recent transportation ti mes are considered in selecting a path.

Figure 4:
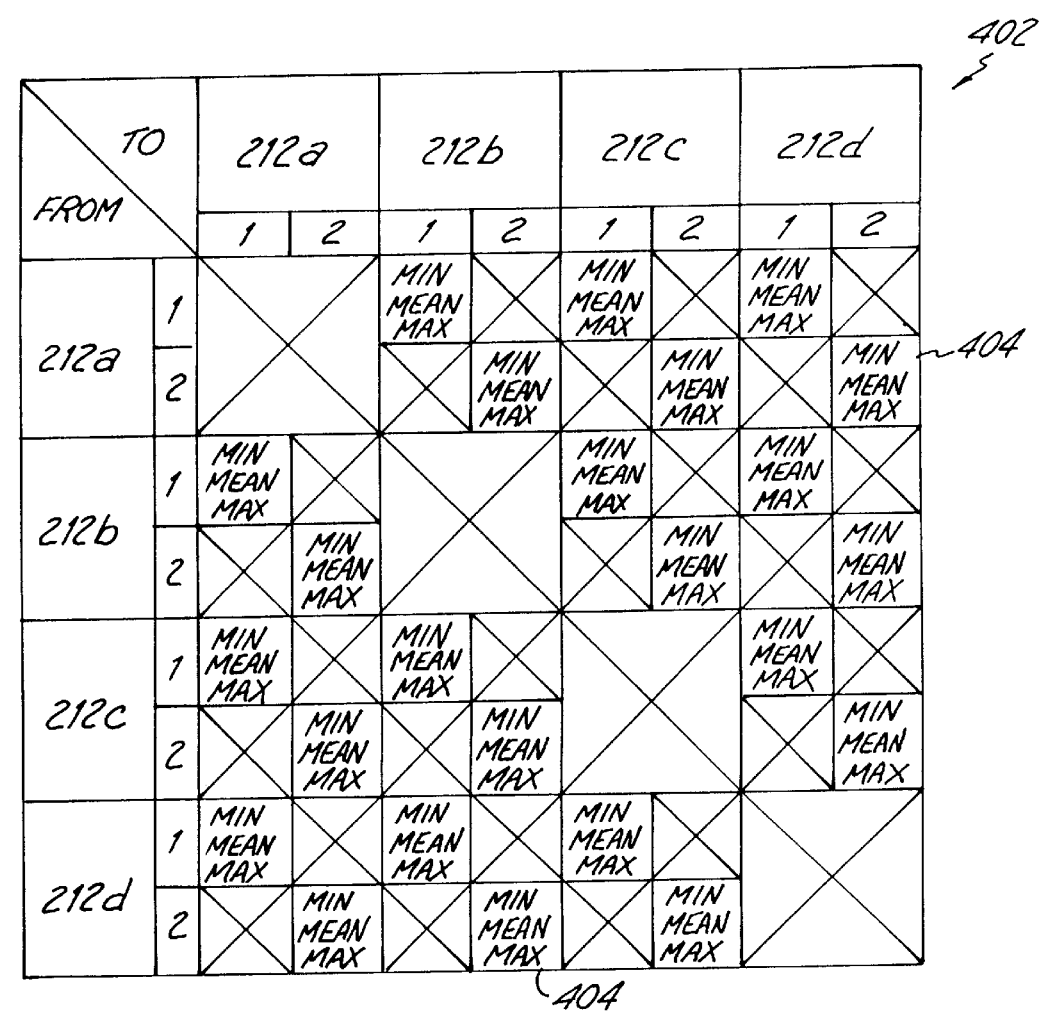

FIG. 4 is a n example logical table, relative to the manufacturing arrangement of FIG. 2, having minimum, mean, and maximum durations of time expended in transporting cassettes between locations using the respective paths. Hereinafter, the table will be referred to as the transport time distribution table 402. As with the transport time table 302, the distribution table 402 is indexed by storage locations and paths for transporting cassettes between the storage locations. The rows of table 402 are indexed by storage locations 212a–d, and the columns are indexed by storage locations 212a–d. Paths 1 and 2 serve as further indices to table 402. For example, storage block 404 contains the minimum, mean, and maximum durations of time expended in transporting cassettes from storage location 212 to storage location 212b via path 2.

Each time the transport time table 302 is updated with a new transport time, the corresponding block in the transport time distribution table 402 is updated with a new minimum, mean, and maximum duration of time. For example, when a cassette is transported from storage location 212d to storage location 212b via path 2, the entry in block 304 referenced by the next replacement pointer, for example, entry number 3, is updated with the duration of time expended in transporting the cassette. The new transportation time is compared against the minimum time set forth in block 404, and if the new transport time is less than the present minimum time, block 404 is updated appropriately. The new transport time is also compared against the maximum time set forth in block 404, and if the new transport time is greater than the present maximum time, block 404 is updated accordingly. The mean duration of time in block 404 is re-computed using the transport times of block 304. In the example embodiment, the CSMs 43a–d use the minimum, mean, and maximum durations of time set forth in the transport time distribution table 402 in making a selection of a path on which to transport a cassette from one location to another.

FIG. 5 illustrates an example transport time distribution table 502. The example durations of time set forth in table 502 correspond to respective minimum, mean, and maximum durations of time for transporting cassettes between the locations illustrated in FIG. 2 via path 1 and path 2. The example durations of time are in minutes.

Turning now to FIGS. 6A, 6B, and 6C, respective time lines illustrate the relationships between minimum, mean, and maximum durations of time expended in transporting cassettes from location 212a to location 212b, from location 212b to location 212d, and from location 212a to location 212c via path 1 and path 2. The duration values illustrated in FIGS. 6A–6C are taken from the transport time distribution table 502 of FIG. 5. The illustrated relationships between the ranges of durations of time for path 1 and path 2 are used to explain how a path is selected in the example embodiment of the present invention.

In FIG. 6A, ranges of durations of time are illustrated for path 1 and path 2 for transporting cassettes from location 212a to location 212b. The minimum time expended in transporting cassettes on path 1 is 5 minutes, the maximum time expended in transporting cassettes on path 1 is 15 minutes, and the mean time expended in transporting cassettes on path 1 is 10 minutes. In comparison, the minimum time expended in transporting cassettes on path 2 is 20 minutes, the maximum time expended in transporting cassettes on path 2 is 30 minutes, and the mean time expended in transporting cassettes is 25 minutes. In the example embodiment, a respective one of CSMs 43a–d selects one of path 1 or path 2 according to the path that is most likely to provide transportation of the cassette in the shortest duration of time. To do so, two "random" time values are generated. The first random time value is a function of the minimum, maximum, and mean durations of time on path 1, and the second random time value is a function of the minimum, maximum, and mean durations of time relative to path 2. The random time value of path 1 has a lower bound of the minimum duration of time for path 1, namely 5 minutes, and an upper bound of the maximum duration of time for path 1, namely 15 minutes. Similarly, the second random time value has a minimum value of 20 minutes and a maximum value of 30 minutes. The two random time values are then compared, and the path associated with the lesser of the two random time values is selected for transportation of the cassette. The function for generating a random time value weights the output according to the minimum, mean, and maximum durations of time. Thus, the random time value produced for a path having minimum, mean, and maximum durations of time that are less than those of another path is likely to be less than the random time value produced for the other path. See FIG. 8 for further discussion on the function for generating a random time value.

FIG. 6B illustrates a different relationship, from that of FIG. 1, of the durations of time associated with path 1 as compared to the durations of time associated with path 2. The time line is relative to transporting a cassette from location 212b to location 212d. The range of times expended in transporting cassettes on path 1 overlaps the range of times expended in transporting cassettes on path 2. In selecting between path 1 and path 2, the random number associated with path 1 is between 10 minutes and 20 minutes, and the random number associated with path 2 is between 15 minutes and 25 minutes. Given that the minimum and maximum durations of time of path 1 overlap the minimum and maximum durations of time of path 2, either of path 1 or path 2 may be selected based upon the lesser of the two random numbers generated. FIG. 6C illustrates a scenario in which the minimum, maximum, and mean durations of time of path 1 coincide with the minimum, maximum, and mean durations of time for path 2.

Figure 7:
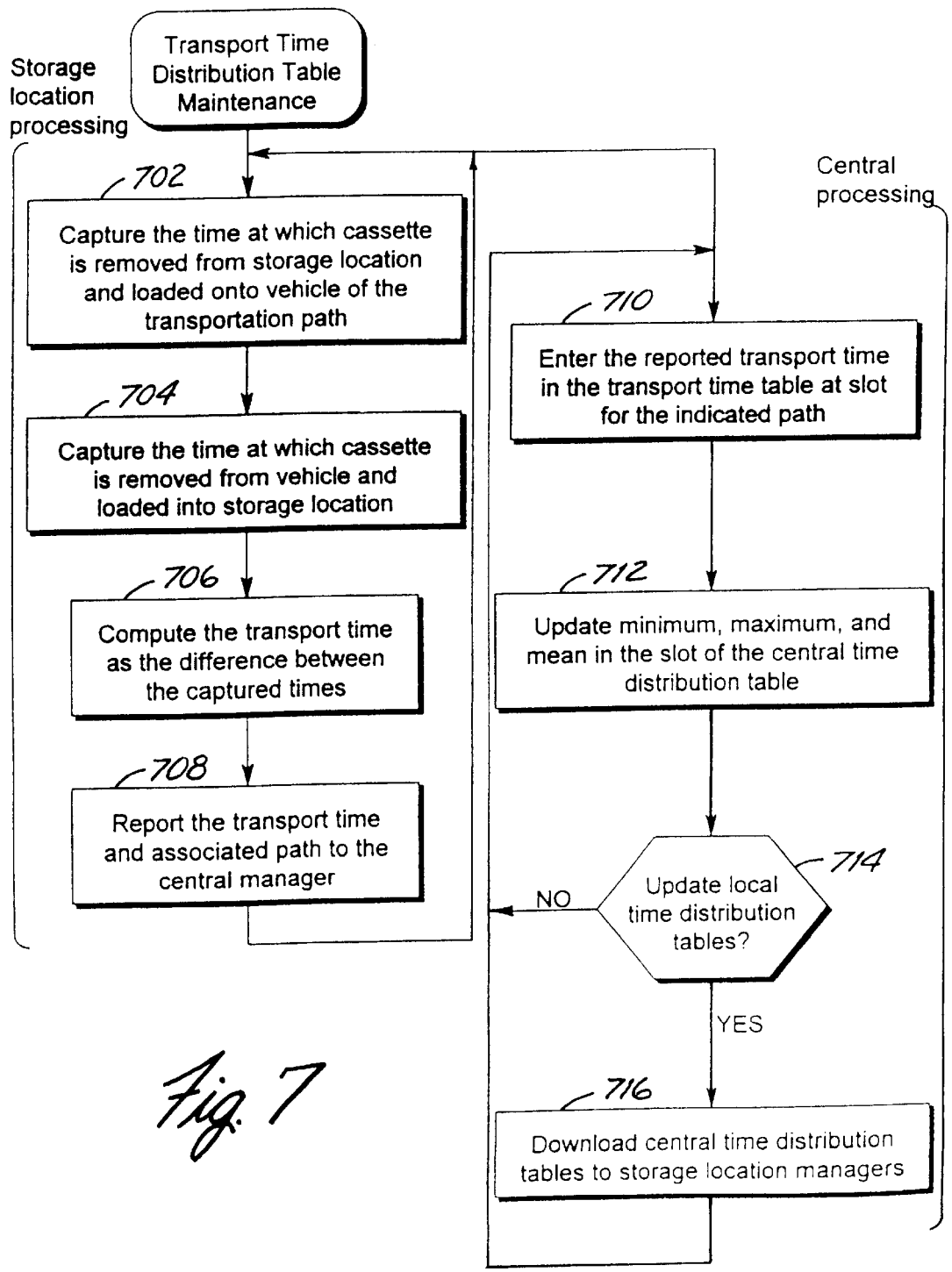
FIG. 7 is a flowchart of an example method for establishing and maintaining the tables of FIGS. 3 and 4.

FIG. 7 is a flowchart of an example method for maintaining the transport time table 302 and transport time distribution table 402. The processing of FIG. 7 relates to the example embodiment of the system of FIG. 1. In the example system of FIG. 1, CFM 48 maintains a centralized transport time table 302 and a centralized transport time distribution table 402. Each of CSMs 43a–d reports to CFM 48 durations of time expended in transporting cassettes between locations. CFM 48 updates the transport time table 302 and makes a corresponding adjustment of the transport time distribution table 402. In one embodiment, the transport time distribution table 402 is periodically downloaded from the CFM 48 to the CSMs 43a–d. In an alternate embodiment, rather than each of CSMs 43a–d maintaining a local copy of transport time distribution table 402, the CSMs consult a centralized transport time distribution table, maintained at CFM 48, each time a cassette is to be transferred between locations. In yet another embodiment, the transport time distribution table 402 is managed on a distributed basis by CSMs 43a–d, such that each of CSMs 43a–d maintains a local copy of the transport time distribution table and the CSMs coordinate synchronization of the locally maintained copies.

The processing of FIG. 7 is divided into two general sections. The first section describes processing that occurs at the storage locations, for example, CSMs 43a–d, and the second general section describes processing that occurs at the centralized CFM 48. Beginning now at block 702, when a cassette is to be moved from a first (source) location to a second (destination) location, the respective CSM 43a–d captures the time at which the cassette is removed from the local storage location and loaded onto the vehicle of the selected transportation path. At block 704, the time at which the cassette is removed from the vehicle and loaded into the destination storage location is captured. It will be appreciated that in an example embodiment the source CSM sends a network message to the destination CSM, where the message identifies the cassette and indicates the departure time. The destination CSM computes the difference between the departure time and the arrival time at block 706 and reports the transport time, along with source, destination, and the associated path, to CFM 48 at block 708. Control then returns to block 702 for another iteration of capturing and reporting the transport time for another cassette.

The reporting of a transport time as indicated by block 708 also results in the initiation of central processing at the CFM 48, as indicated by block 710. At block 710, the reported transport time is entered in the appropriate slot in the transport time table 302. The proper slot of the transport time table is indicated by the source, destination, and associated path of the report of the transport time from the respective one of the CSMs 43a–d. Once the transport time is recorded in the transport time table 302, at block 712 the minimum, maximum, and mean transport time entries in the transport time distribution table 402 are updated.

Continuing now at decision block 714, CFM 48 tests whether it is time to update local time distribution tables maintained at respective ones of CSMs 43a–d. The determination of whether to update the local tables may be made according to the passage of time, or alternatively, according to a number of reported transport times since the most recent update of the local tables. If it is time to update the local tables, control is directed to block 716 where the central transport time distribution table 402 is downloaded to the CSMs 43a–d. Otherwise, control is returned to block 710 to process the next reported transport time.

Figure 8:
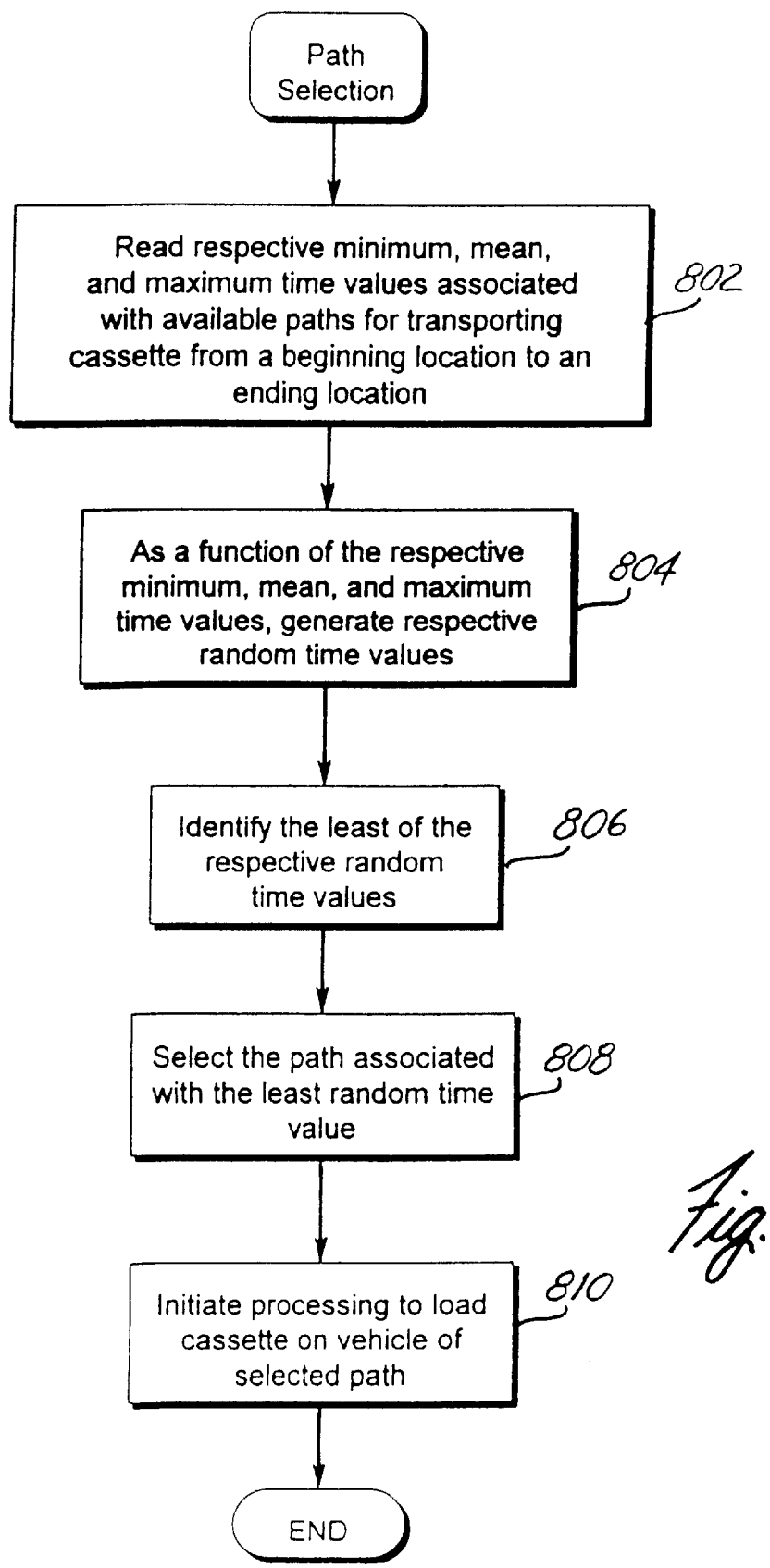
FIG. 8 is a flowchart of an example method for selecting a path on which to transport a cassette as a function of the durations of time expended in transporting cassettes on the various ones of the available paths.

FIG. 8 is a flowchart of an example method for selecting one path from a plurality of paths for transporting a cassette from one location to another. The method of FIG. 8 uses the example transport time distribution table 402. When a storage location manager, for example, one of CSMs 43a–d, receives a request to initiate movement of a cassette from its storage location to a destination storage location, the respective minimum, mean, and maximum durations of time associated with the available paths for transporting the cassette from the location to the destination location are read from the transport time distribution table 402, as shown by block 802.

Respective "random" time values are generated as a function of the minimum, mean, and maximum durations of time associated with the paths under consideration (block 804). In the example embodiment, the minimum, mean, and maximum values for the durations of time form a triangular distribution. The book, "Simulation Modeling and Analysis" by Law and Kelton (McGraw-Hill, Inc., 1991), describes a function for generating a triangular random variate for given minimum, mean, and maximum values. Thus, in the example embodiment, each random time value is a triangular random variate whose value is weighted by the minimum, maximum, and mean durations. For example, overlapping distributions are illustrated in FIG. 6B for transporting cassettes from location 212b to location 212d. However, because the minimum, maximum, and mean durations associated with path 1 are less than their counterparts for path 2, the random time value generated for path 1 is relatively likely to be less than the random time value for path 2. Where the paths have the same minimum, mean, and maximum durations (see FIG. 6C), the probability that the first random time value will be less than the second random time value is 50%.

At block 806, the least of the respective random time values is identified, and the path associated with the least random time value is selected at block 808. The storage manager of the location from which the cassette is to be moved issues instructions to cause a robotic device (for example, 214a-1) to load the cassette on the selected path. It will be appreciated that the processing of FIG. 8 is repeated for each request to move a cassette from a source location to a destination location.

In sum, the present invention is directed to a system and method for directing the movement of material in a manufacturing environment having multiple paths by which the material may be moved. Accordingly, the present invention should not be considered limited to the particular examples described above, but rather should be understood to cover all aspects of the invention as fairly set out in the attached claims. For example, the present invention is, in particular, not limited to manufacturing environments having only two paths. Rather, the invention extends to cover environments having two or more paths. In such cases, a historical record may be kept for each path and time comparison may be made between each of the paths in the selection of a particular path for transport. Various modifications, equivalent processes, as well as numerous environments to which the present invention may be applicable will be readily apparent to those of skill in the art to which the present invention is directed upon review of the present specification. The claims are intended to cover such applications.

We claim:

1. A method for selecting a path for transporting a cassette from a first location to a second location in an automated manufacturing arrangement having a plurality of paths, including at least a first path and a second path, for transporting the cassette, comprising the steps of:

maintaining an historical record of codes indicative of periods of time expended in transporting cassettes from a first location to a second location via the first path and second path, respectively;

determining, as a function of the historical record of codes associated with the paths, which of the first or second paths is more likely to result in a lesser period of time in transporting the cassette; and selecting one of the first or second paths according to which path is more likely to result in a lesser period of time in transporting the cassette.

2. The method of claim 1, further comprising the steps of:

determining from the historical record of codes associated with the paths, respective minimum and maximum time period values; and determining, as a function of the respective minimum and maximum time period values associated with the paths, which of the first or second paths is more likely to result in a lesser period of time in transporting the cassette.

3. The method of claim 2, further comprising the steps of:

computing from the historical record of codes associated with the paths, respective averages indicative of average periods of time expended in transporting cassettes from the first location to the second location via the first and second paths;

determining, as a function of the respective minimum and maximum time period values and the averages, which of the first or second paths is more likely to result in a lesser period of time in transporting the cassette.

4. The method of claim 3, further comprising the steps of:

generating a first random time value as a function of the minimum and maximum time period values and average time period corresponding to the first path;

generating a second random time value as a function of the minimum and maximum time period values and average time period corresponding to the second path; and selecting the path associated with the lesser of the two random time values.

5. The method of claim 4, wherein the random time values are random triangular variates.

6. The method of claim 1, wherein the historical record of codes contains a predetermined number codes indicative of periods of time expended in the predetermined number of most recent transports of cassettes from the first location to the second location.

7. A method for selecting a path for transporting a cassette from a first location to a second location in an automated manufacturing arrangement having a plurality of paths, including at least a first path and a second path, for transporting the cassette, comprising the steps of:

measuring periods of time expended in transporting cassettes from a first location to a second location along the first path;

measuring periods of time expended in transporting cassettes from the first location to the second location along the second path;

associating time period codes indicative of respective measured periods of time with the first and second paths, respectively;

in selecting one of the first or second paths for transporting a particular cassette from the first location to the second location, determining, as a function of the time period codes associated with the respective paths, which of the first or second paths is more likely to result in a lesser period of time in transporting the cassette; and selecting one of the first or second paths according to which path is more likely to result in a lesser period of time in transporting the cassette.

8. The method of claim 7, further comprising the steps of:

determining from the time period codes, respective minimum and maximum time periods from the periods of time associated with the first and second paths, respectively;

associating with the first and second paths, respectively, minimum and maximum time period codes indicative of the minimum and maximum time periods; and in selecting one of the first or second paths for transporting a particular cassette, determining, as a function of the minimum and maximum time period codes associated with the paths, which of the first or second paths is more likely to result in a lesser period of time in transporting the cassette.

9. The method of claim 8, further comprising the steps of:

computing averages of the measured periods of time for the first and second paths, respectively;

associating the averages with the first and second paths, respectively; and in selecting one of the first or second paths for transporting a particular cassette, determining, as a function of the minimum and maximum time period codes and the averages associated with the paths, which of the first or second paths is more likely to result in a lesser period of time in transporting the cassette.

10. The method of claim 9, further comprising the steps of:

generating a first random time value as a function of the minimum and maximum time period codes and average time period of the first path;

generating a second random time value as a function of the minimum and maximum time period codes and average time period of the second path; and selecting the path associated with the lesser of the two random time values.

11. The method of claim 10, wherein the random time values are triangular random variates.

12. The method of claim 7, wherein the step of associating time period codes with the first and second paths associates a predetermined number of most recent time period codes.

13. The method of claim 7, further comprising the steps of:

measuring the periods of time at storage location processors;

reporting the time period codes to a central processor;

associating the time period codes with the first and second paths at the central processor;

maintaining at the central processor a table having minimum, average, and maximum codes indicative periods of time associated with transporting cassettes between locations via the first path and second path, respectively; and periodically downloading the table to the storage location processors.

14. An apparatus for selecting either a first or a second path for transporting a cassette from a first location to a second location in an automated manufacturing arrangement, comprising:

means for maintaining an historical record of codes indicative of periods of time expended in transporting cassettes from a first location to a second location via the first path and second path, respectively;

means for determining, as a function of the historical record of codes associated with the paths, which of the first or second paths is more likely to result in a lesser period of time in transporting the cassette; and means for selecting one of the first or second paths according to which path is more likely to result in a lesser period of time in transporting the cassette.

15. An apparatus for selecting a path for transporting a cassette from a first location to a second location in an automated manufacturing arrangement having a plurality of paths, including at least a first path and a second path, for transporting the cassette, comprising:

means for measuring periods of time expended in transporting cassettes from a first location to a second location along the first path;

means for measuring periods of time expended in transporting cassettes from the first location to the second location along the second path;

means for associating time period codes indicative of respective measured periods of time with the first and second paths, respectively;

means for determining, as a function of the time period codes associated with the respective paths, which of the first or second paths is more likely to result in a lesser period of time in transporting a particular cassette from the first location to the second location; and means for selecting one of the first or second paths according to which path is more likely to result in a lesser period of time in transporting the particular cassette.

16. A computer controlled manufacturing arrangement with control for selecting between multiple paths for transporting cassettes between processing locations, comprising:

a plurality of stockers interconnected with tracks on which cassettes are carried on vehicles, wherein a first stocker and a second stocker are interconnected by at least a first path and a second path formed by the tracks;

a plurality of robotic arrangements configured to transfer cassettes between the stockers and the vehicles, wherein a first one of the plurality of robotic arrangements is configured to transfer cassettes between the first stocker and vehicles on the first and second paths; and a data processing system coupled to the robotic arrangements and configured and arranged to maintain an historical record of codes indicative of periods of time expended in transporting cassettes from the first stocker to the second stocker via the first path and second path, respectively, to determine, as a function of the historical record of codes associated with the paths, which of the first or second paths is more likely to result in a lesser period of time in transporting the cassette, and to select one of the first or second paths according to which path is more likely to result in a lesser period of time in transporting the cassette.

17. A method for selecting a path for transporting an article from a first location to a second location in an automated manufacturing arrangement having two or more paths for transporting articles, comprising the steps of:

maintaining a historical record of codes indicative of periods of time expended in transporting cassettes from a first location to a second location via each of the paths;

determining, as a function of the historical record of codes associated with the paths, which particular path of the plurality of paths is more likely to result in a lesser period of time in transporting the cassette; and selecting the particular path for transporting the cassette.

* * * * *